Aug. 3, 1965   J. ADAMS   3,198,579
TRACTOR TRAILER DUMPING HOPPER VEHICLE
Filed April 17, 1961   4 Sheets-Sheet 1
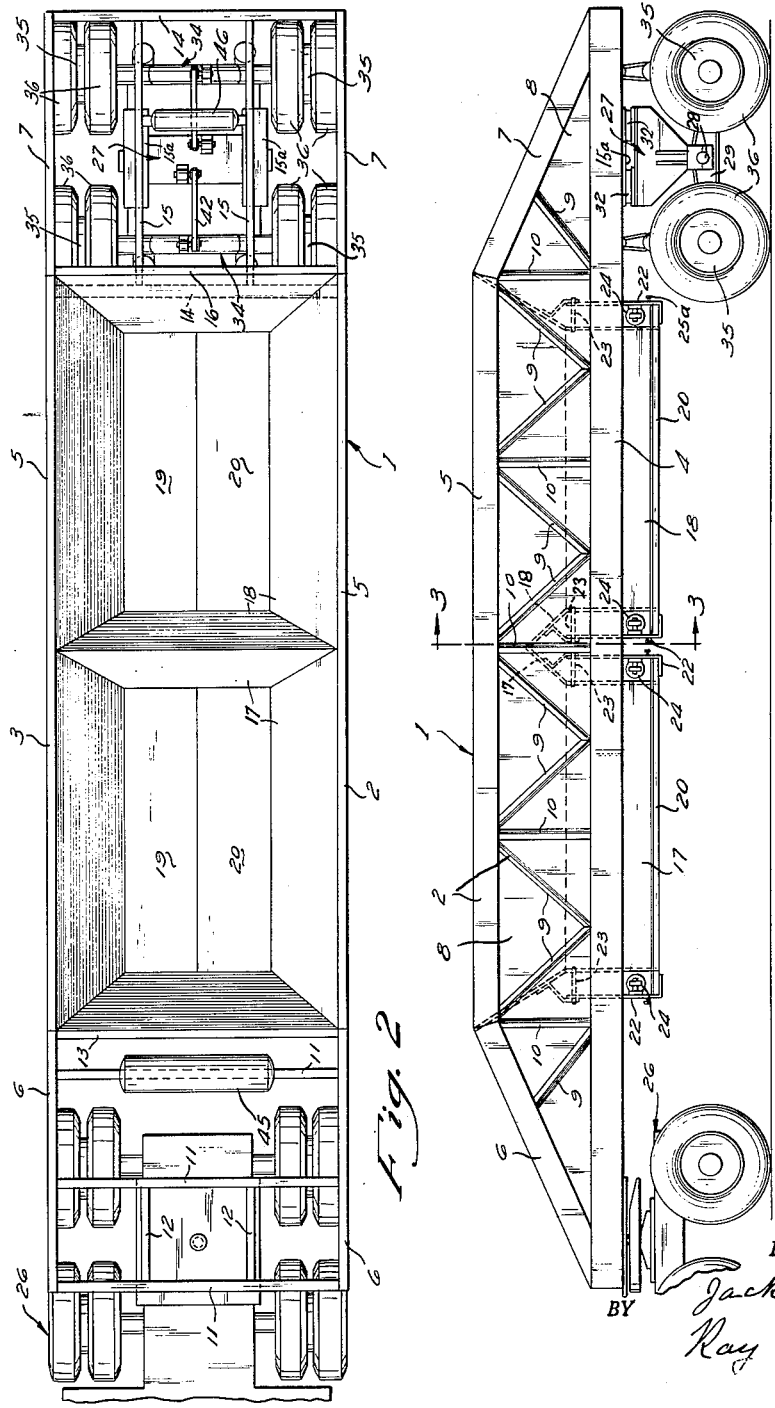
INVENTOR.
Jack Adams
BY Ray S. Gehr
ATTORNEY Aug. 3, 1965  J. ADAMS  3,198,579
TRACTOR TRAILER DUMPING HOPPER VEHICLE
Filed April 17, 1961  4 Sheets-Sheet 2

INVENTOR.
BY Jack Adams
Ray S. Gehr
ATTORNEY

Aug. 3, 1965 J. ADAMS 3,198,579
TRACTOR TRAILER DUMPING HOPPER VEHICLE
Filed April 17, 1961 4 Sheets-Sheet 3

INVENTOR.
BY Jack Adams
Ray S. Gehr
ATTORNEY

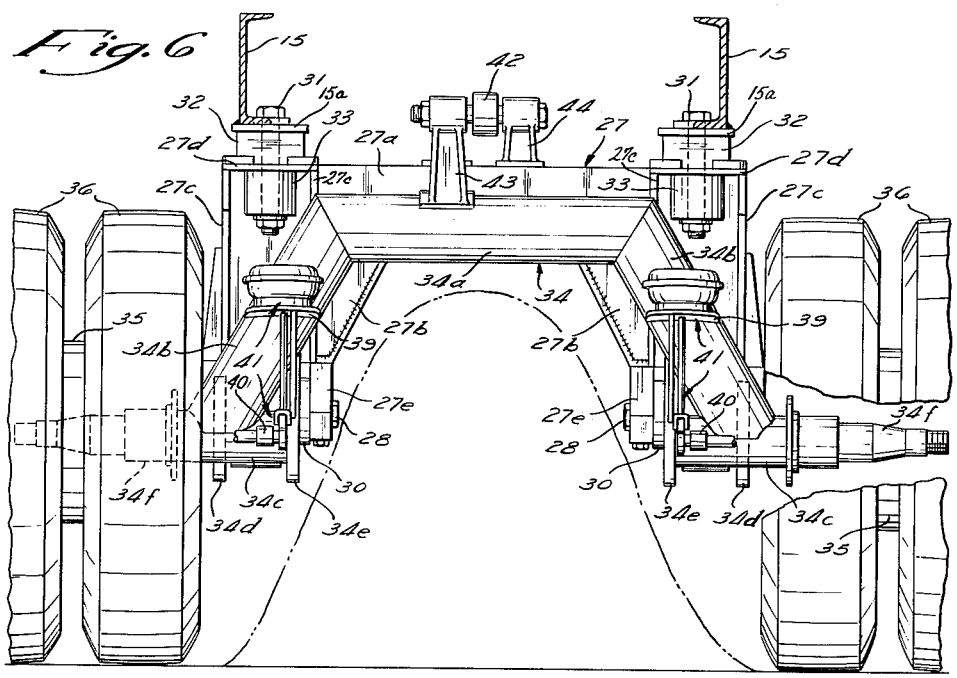
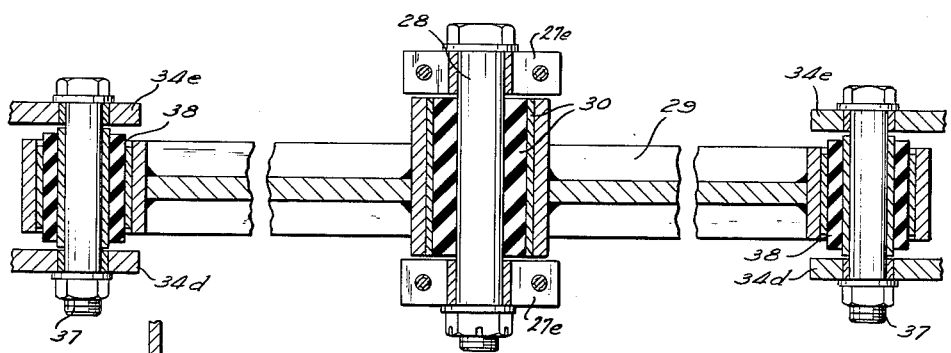
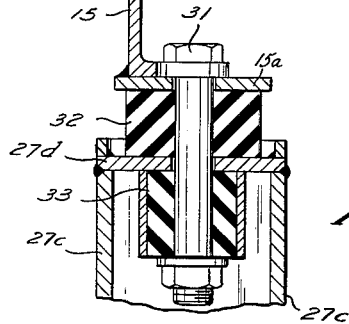

United States Patent Office 3,198,579
Patented Aug. 3, 1965

1

3,198,579
TRACTOR TRAILER DUMPING HOPPER
VEHICLE
Jack Adams, Santa Fe, N. Mex.; Jeanine Adams Gruschus, executrix of said Jack Adams, deceased
Filed Apr. 17, 1961, Ser. No. 103,601
8 Claims. (Cl. 298—35)

This invention relates to dump trucks for conveying and handling bulk materials such as soil, gravel, crushed rock and the like and especially to dump trucks suitable for use in the construction of roadbeds of highways.

The nature, purpose and significance of the invention can best be understood from a consideration of the conditions which have long prevailed in the construction of highway road beds. In this work great masses of soil, gravel and crushed rock must be picked up at the place of origin, transported to the road construction site and there deposited and suitably placed.

For many years now this work has been highly mechanized. At the place of origin of the material to be handled large capacity massive excavating and elevating machines, operating continuously, deliver the bulk material into an elevated hopper from which a large-capacity truck can be loaded in a fraction of a minute, so that a single loading equipment can serve a considerable number of trucks plying between the loading place and the road construction site, which are sometimes relatively close together but often miles apart and sometimes the truck haul (over available intervening highway) may be twenty-five or thirty miles.

On arrival at the construction site the motor trucks dump their loads as nearly as possible where the material is to be placed in the roadbed, the effort being to minimize labor in spreading the material. Some contractors have attempted to deposit the material on a continuous line down the center of the road bed under construction so that it can be spread by the blade of a motorized implement. The effectiveness of this procedure, however, with the bottom-drop trucks heretofore available has been very limited because the axles and wheels are so obstructed by the dumped material that the truck often is stalled and a crawler-type tractor or other powerful machine which may be available is called in to free the stalled truck. The result is a serious delay in the flow and placing of construction material.

From what has been said it is apparent that in this branch of the highway contractor's work as heretofore conducted, there is a great disparity in the time consumed in truck loading and truck unloading, and that there is a similar disparity between time of loading and time of transportation, especially where there is a long highway haul. Because of these disparities, the contractor is forced to have an unduly large capital investment in truck equipment while, in addition, his loading equipment is not fully utilized because of partial idleness. The overall result of the stated conditions is slow highway construction with inconvenience to the public and high construction cost at the expense of the tax payer.

It is the general object of the present invention to overcome the foregoing adverse conditions by providing a new and improved bottom-dump truck which has high load capacity, fully complies with legal dimensional limitations for highway vehicles, is capable of discharging its load on the roadbed area in the form of a continuous windrow of substantially uniform size without interference between the truck running gear and the discharged material, and which is capable of economic highway operation at high speed.

A further object of the invention is to provide a truck fulfilling the general object specified and which has a multiple axle running gear in which the axles and associated load-bearing parts have a novel arched form of construction of great strength and rigidity.

Another object of the invention is the provision, in a truck fulfilling the general object above specified, of simple means for varying the transverse dimensions of the windrow of the material discharged by the truck.

Further objects of the invention more or less incidental or ancillary to the stated general object, as well as the manner in which all the objects of the invention are attained, will become apparent from a consideration of the following description in which a preferred embodiment of the invention is set forth with reference to the accompanying drawings, it being understood that the invention is not limited in scope to the particular forms of construction shown in the drawings but includes a range of equivalent forms commensuate with the breadth and importance of the invention and within the bounds of the claims at the end of this specification.

In the drawings:

FIG. 1 is a side elevation of a semi-trailer truck embodying the present invention, and a portion of the rear end of a conventional truck tractor to which the trailer is coupled in known manner.

FIG. 2 is a plan view of the structures shown in FIG. 1.

FIG. 6 is an enlarged rear elevation of the axle structure and supporting wheels, the wheel structure on one side being partly broken away to show the hub-engaging part of the axle.

FIG. 7 is an enlarged fragmentary section on the line 7—7 of FIG. 5, with parts broken away to permit the enlarged showing.

FIG. 8 is an enlarged fragmentary section on the line 8—8 of FIG. 5.

Figure 3:
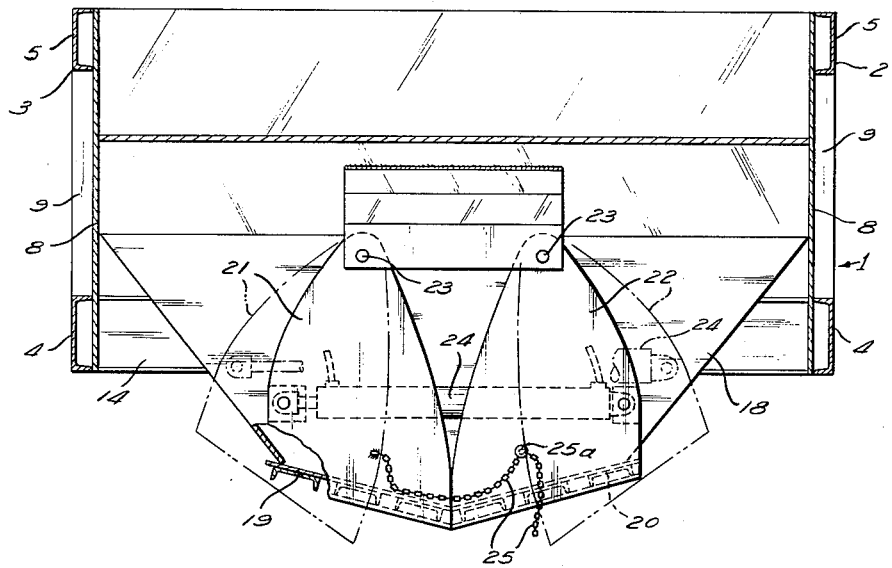
FIG. 3 is an enlarged vertical section on the line 3—3 of FIG. 1.
Figure 4:
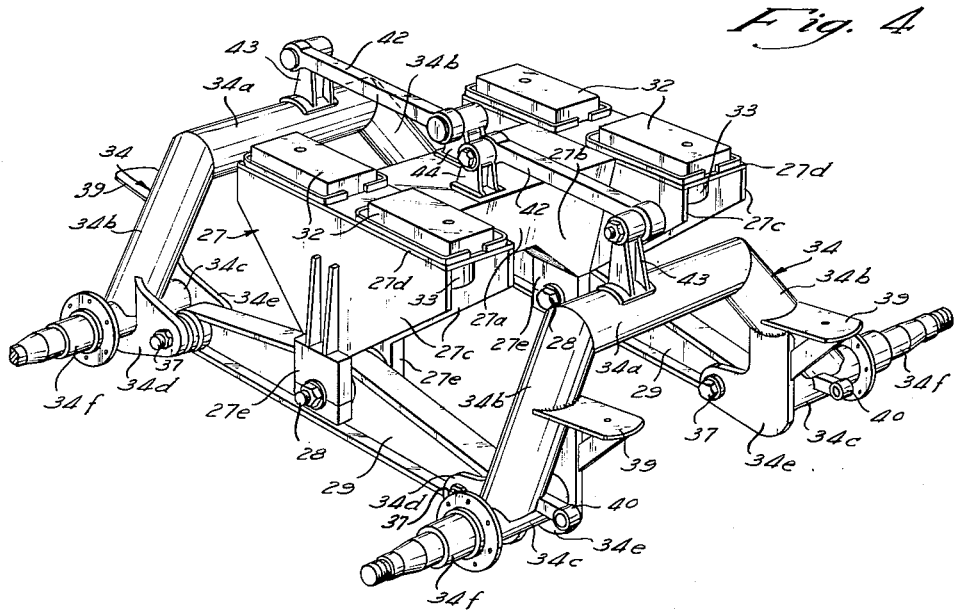
FIG. 4 is an enlarged perspective view of the multiple-axle running gear of the truck.

Referring now in detail to the construction shown in the drawings, the numeral 1 generally designates the main frame and body structure of the truck. It is made of structural steel parts welded together to form an exceedingly strong structure. The two major parts of the structure are in the form of trusses 2 and 3, each of which comprises a lower channel 4, a parallel upper channel 5, inclined front and rear channels 6 and 7, heavy steel plate 8 and bracing angles 9 and 10.

The trusses 2 and 3 at their front ends are rigidly connected together at the level of channels 4, 4, by transverse channels 11, 11 which are braced by longitudinal channels 12, 12, and, at the level of channels 5, 5 by channel 13. Similarly, at the rear end of the truck frame, the bottoms of the trusses are connected together by transverse channels 14, 14 that are braced by channels 15, 15, while the tops of the trusses are connected by transverse channel 16.

Intermediate the front and rear end sections of the truck frame and supported by trusses 2 and 3 are tandem-arranged hoppers 17 and 18. Each hopper has its bottom discharge opening controlled by a pair of laterally swinging doors 19, 20, the doors 19 being carried by a pair of hangers 21, 21 and the doors 20 by similar hangers 22, 22. Adjacent hangers 21, 22 are supported at their tops from the adjacent transverse hopper wall by pivot pins 23, 23 which are so located that the doors are normally held in closed position by gravity.

Each pair of hangers 21, 22 is fitted with an operating compressed-air motor 24 disposed between the hangers 21, 22 and the adjacent transverse wall of the hopper, each such air motor having its cylinder pivotally connected at one end to one of the two hangers and the outer end of its piston rod similarly connected to the other hanger, so that, when air is admitted to one end of each of the two cylinders serving a hopper, adjacent hangers are forced together to close the hopper doors and when air is admitted to the other end of the cylinders the hangers and doors are moved to open position. To control the amount of the opening movement of the hangers and doors each pair of cooperating hangers is provided with a chain 25 fixedly attached at one end to one of the hangers and adjustably connected to a headed pin 25a on the other hanger to vary the opening movement of the hangers by varying the effective length of the chain.

The frame 1 of the truck is in known manner pivotally connected to and supported on the rear end of a power tractor truck of conventional construction generally designated by numeral 26. The rear end of truck frame 1 is supported on a plural-axle running gear of novel construction which will now be described.

Figure 5:
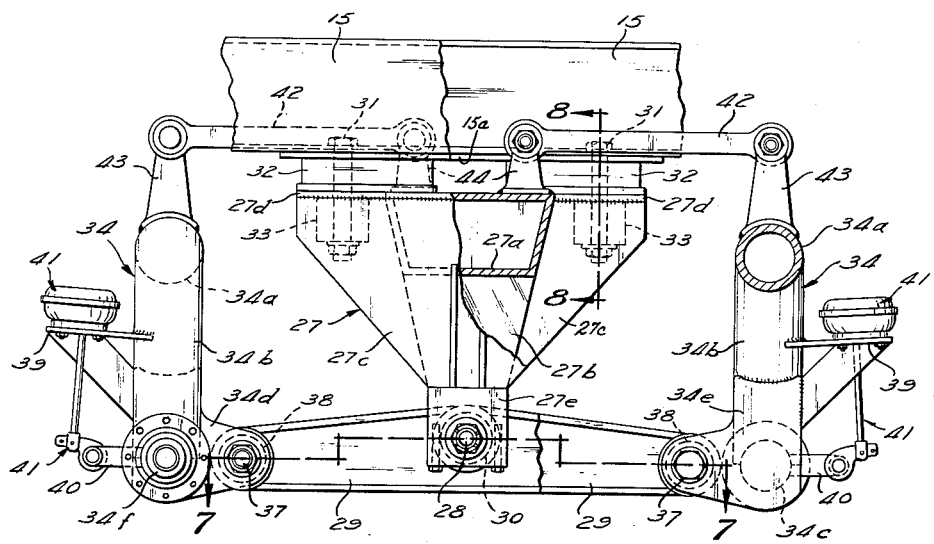
FIG. 5 is an enlarged side elevation of the running gear with some of the structure broken away and a part of it shown in vertical section.

As shown in FIGS. 4–8 the running gear comprises a massive saddle unit generally designated by numeral 27. This saddle, which is disposed transversely of the truck frame, is fabricated from heavy rolled steel plate parts welded together to form a high-arched structure of which the yoke or transverse part 27a and the two depending legs 27b, 27b are of box construction and the legs have forwardly and rearwardly extending flanges 27c, 27c covered by cap plates 27d. Each leg at its lower end has a pair of depending lugs 27e fitted with a shaft 28 on which is mounted a longitudinally disposed walking beam 29, with interposed rubber-clad bearing sleeves 30, 30 of known construction (FIGS. 5 and 7). The saddle 27 is secured to the under sides of frame channels 15, 15 by four bolts 31, 31 with interposed rubber blocks 32, 33 (FIGS. 6 and 8).

Two similar ground wheel axles, each designated generally by the numeral 34, are operatively connected to the front and rear ends, respectively, of the walking beams 29, 29. Each axle is of a high-arched form with its middle yoke section 34a and two leg sections 34b, 34b of heavy section steel tubing welded together to form a structure of great strength and rigidity. At the lower end of each leg section the axle has a transverse sleeve part 34c and spaced lugs 34d, 34e, each sleeve part carrying a stub axle 34f for a conventional dual-wheel structure 35 fitted with pneumatic tires 36, 36 suitable for high-speed travel. The lugs 34d, 34e extend forward (or rearward, as the case may be) and carry a pivot bolt 37 which is connected, with a conventional rubber-clad sleeve 38 interposed, to one end of walking beam 29 (FIG. 7)

To the side of each axle leg 34b opposite its lugs 34d, 34e are welded brackets 39 and 40 which carry conventional air brake operating equipment, of the diaphragm motor type, generally designated by numeral 41 (FIGS. 5, 6) to serve each dual wheel of the running gear.

Each of the axles 34, 34 is maintained in upright position by a link 42, which pivotally connects a lug 43 on the axle to a lug 44 on the saddle 27, the pivotal connections having rubber-clad sleeves of the type shown in FIG. 7.

Normally, that is when the running gear wheels rest on level ground surface, the links 42 maintain the yokes of the axles at approximately the same height as the yoke of the saddle; but obviously the yokes of the axles and saddle need not be at the same height to secure substantial benefits of the dual high-arch axle construction.

The truck is fitted with conventional air brake equipment comprising a compressor, which in the case of a trailer truck is carried by the tractor, one or more surge tanks, such as are shown at 45 and 46, FIG. 2, suitable air lines connecting the compressor to the surge tanks and the latter to the operating cylinders 24 of the hopper doors and to the brake motors of the truck running gear, the air lines being fitted typically with electrically actuated valves subject to manual control means in the truck cab. Such compressed-air systems are well known in the truck art and therefore have not been illustrated.

By way of further explanation of the invention, the operation of the truck in typical highway roadbed construction, with the source of material to be hauled at a substantial distance from the place of construction, will now be described.

Assuming the provision at the material source of modern loading equipment earlier referred to, the loading time, even for a truck of thirty cubic yards load capacity is very short. With a highway haul of several miles to the construction site—in the inventor's experience hauls up to twenty-five or thirty miles long have been encountered—it is important to move over the highway at the maximum legal speed and this is made possible by the adaptation of the improved truck construction to the use of tires with flexible walls capable of high speed operation without unduly rapid deterioration. During the haul over the highway the dump doors of the truck are held in closed position by maintaining air pressure in the cylinders 24 to avoid illegal littering of the highway.

On arriving at the construction site the truck moves into position to dump its load on a line down the middle of the roadbed area so that the construction material is discharged in continuous windrow form. The very high and wide clearance of the truck running gear makes it possible to do this rapidly and effectively so that the time of unloading and starting a fast return run to the loading place is comparable to the loading time. When material is dumped to continue a windrow of previously dumped material, the loaded truck is backed over the end of the windrow and, after dumping, is moved forward—all without entangling the running gear with the dumped material. Furthermore, the transverse dimensions of the windrow of material can be varied by changing the adjustment of the stop chains 25 and by regulated movement of the truck during discharge of the load. Thus the transverse dimensions of the windrow can to a considerable extent be regulated in relation to the width of the roadbed. Specifications usually call for a specified thickness of the roadbed material and uniform windrow dimensions greatly facilitates spreading of the material with a bladed power implement.

It should be noted that certain of the structural features of the described running gear contribute greatly to the attainment of ample clearance for a windrow of dumped material. One of these features is concerned with the matter of strength and rigidity. The substantial time consumed in hauling material from the source to the roadbed construction site makes it imperative not only that a maximum truck speed be attained in the highway travel of the truck but also that a construction of very high load capacity be provided. Thus for a 40,000-pound net load capacity the described running gear must carry approximately 20,000 pounds. Heretofore, it has been deemed impossible to give an arched type of running gear the strength and rigidity necessary to stand up under such a load. The entire load on the running gear is carried by the saddle structure and it is believed that the successful performance of this part of the gear is due to the box construction of rolled steel material made possible by welding and having the required strength and rigidity. And the same principle is in effect embodied in the arched axles built up by welding together heavy section high strength steel tubing parts.

A feature ancillary to the matter of structural strength and rigidity of the present running gear construction is the use in all working joints of rubber-clad bearing sleeves and use of rubber blocks in the bolted joints between the saddle and frame structures. This expedient permits accommodation of the running gear to uneven ground surfaces without undue structural strain under heavy load and at the same time minimizes admission of dirt to bearing surfaces.

Another structural feature of the present truck is concerned with the provision of clearances for a windrow of adequate width notwithstanding legal overall width limits for trucks used in highway travel. This condition is met in part by disposing the necessary pivotal couplings between the walking beams and the axles on the front (or rear) sides of the leg portions of the arched axles. The meeting of this same condition is further facilitated by disposing the brake operating gear on the side of the axle leg opposite the pivotal walking beam coupling and by disposing the link devices 42, 43, 44 outside the longitudinally extending clearance space below the yoke parts and between the depending legs of the saddle 27 and the axles 34.

What is claimed is:

1. A dump truck comprising an elongated substantially rectangular frame structure; a hopper-shaped load compartment for bulk material supported on the frame intermediate the ends of the latter and having a door-controlled bottom discharge opening disposed approximately symmetrically in relation to a vertical plane through the longitudinal center line of the truck; and dual-axle running gear supporting the rear end of the truck frame, said running gear comprising a rigid high-arched saddle structure having a horizontal yoke and a pair of mutually-spaced dependent legs and being secured to the under side of the truck frame with its yoke disposed transversely of the frame, a pair of mutually parallel walking beams disposed longitudinally of the truck frame and having their respective midsections pivotally connected to the lower ends of the two saddle legs, a pair of rigid high-arched axle structures disposed parallel to the transverse saddle with one in front of and the other to the rear of the saddle and each having an upstanding arch comprising a yoke and two depending legs and also having two wheel bearing parts connected, respectively, to the lower ends of the leg parts of the arch, means pivotally connecting the lower leg parts of the front axle to the front ends of the walking beams and means similarly connecting the rear axle to the rear ends of the walking beams, means for normally holding the arched portion of each axle in an upright position with its yoke part approximately at the same height as the yoke of the saddle, and four ground-engaging wheel units mounted, respectively, on the four bearing parts of the two axles.

2. A dump truck as claimed in claim 1 in which the means forming pivotal connections between the walking beams and the front and rear axles, respectively, are disposed on the rear and front sides, respectively, of the front and rear axles, whereby maximum windrow clearance between the legs of each axle is afforded.

3. A dump truck as claimed in claim 2 in which the running gear includes brake actuating motors mounted on the sides of the axle legs diametrically opposite the pivotal connecting means between the said legs and the walking beams.

4. A dump truck as claimed in claim 1 in which the means for normally holding the arched portion of each axle in an upright position comprises a link pivotally connected to the yoke of the axle and the yoke of the saddle and in which the means forming pivotal connections between the walking beams and the front and rear axles, respectively, are disposed on the rear and front sides, respectively, of the front and rear axles and in which the running gear includes brake actuating motors mounted on the sides of the axle legs opposite the pivotal connecting means between the said legs and the walking beams and in which blocks of rubber are interposed between the truck frame and the yoke of the saddle and in which the pivotal connecting means between the walking beams and the legs of the saddle and of the axles and between the links and the yoke of the saddle and the yokes of the axles each comprises a rubber-clad bearing sleeve.

5. A dual-axle running gear for trucks of the type having an elongated frame structure and a hopper-shaped load compartment for bulk material supported on the frame intermediate the ends of the latter and having a door-controlled bottom discharge opening disposed approximately symmetrically in relation to a vertical plane through the longitudinal center-line of the truck, the said running gear comprising a high-arched saddle constructed to be secured to the under side of such a truck frame transversely thereof and having a horizontal yoke and a pair of mutually spaced dependent legs connected together to form a rigid unit; a pair of mutually parallel walking beams disposed at right angles to the yoke of the saddle and having their respective midsections pivotally connected to the lower ends of the two saddle legs; a pair of rigid high-arched axle structures disposed parallel to the yoke of the saddle with one in front of and the other to the rear of the saddle and each having an upstanding arch comprising a yoke and two depending legs and also having two wheel bearing parts connected, respectively, to the lower ends of the leg parts of the arch; means pivotally connecting the lower leg parts of the front axle structure to the front ends of the walking beams and means similarly connecting the rear axle structure to the rear ends of the walking beams; means for normally holding the arch portion of each axle in an upright position with its yoke part approximately at the same height as the yoke of the saddle; and four ground-engaging wheel units mounted, respectively, on the four bearing parts of the two axles.

6. A truck running gear as claimed in claim 5 in which the means forming pivotal connections between the walking beams and the front and rear axles, respectively, are disposed on the rear and front sides, respectively, of the front and rear axles, whereby maximum windrow clearance between the legs of each axle is afforded.

7. A truck running gear as claimed in claim 6 in which the running gear includes brake actuating motors mounted on the sides of the axle legs diametrically opposite the pivotal connecting means between the said legs and the walking beams.

8. A truck running gear as claimed in claim 5 in which the means for normally holding the arched portion of each axle in an upright position comprises a link pivotally connected to the yoke of the axle and the yoke of the saddle and in which the means forming pivotal connections between the walking beams and the front and rear axles, respectively, are disposed on the rear and front sides, respectively, of the front and rear axles and in which the running gear includes brake actuating motors mounted on the sides of the axle legs opposite the pivotal connecting means between the said legs and the walking beams and in which the pivotal connecting means between the walking beams and the legs of the saddle and of the axles and between the links and the yoke of the saddle and the yokes of the axles each comprises a rubber-clad bearing sleeve.

References Cited by the Examiner

UNITED STATES PATENTS

| | | | |
|---|---|---|---|
| 888,793 | 5/08 | Enley | 298—35 |
| 1,104,111 | 7/14 | Gerber | 298—34 |

(Other references on following page)

UNITED STATES PATENTS

| | | | |
|---|---|---|---|
| 1,180,634 | 4/16 | Bravi | 105—194 |
| 1,277,889 | 9/18 | Ethridge | 105—182 X |
| 1,706,099 | 3/29 | Benbow et al. | 298—24 |
| 1,969,933 | 8/34 | Le Tourneau | 298—27 |
| 2,009,039 | 7/35 | Armington | 298—35 |
| 2,149,949 | 3/39 | Austin | 298—35 |
| 2,235,215 | 3/41 | Kelly | 280—81 |
| 2,239,286 | 4/41 | Freitag | 280—104.5 |
| 2,494,472 | 1/50 | De Saussure | 298—35 |
| 2,622,705 | 12/52 | Gaensxle | 188—205 X |
| 2,775,466 | 12/56 | Meewes | 280—104.5 |
| 2,836,461 | 5/58 | Shadwick et al. | 298—35 |
| 2,999,695 | 9/61 | Bixby et al. | 280—104.5 |
| 3,001,484 | 9/61 | Bingham | 150—120 X |
| 3,066,948 | 12/62 | Cain | 280—104.5 |

EUGENE G. BOTZ, *Primary Examiner.*

NELSON M. ELLISON, LEO QUACKENBUSH,
*Examiners.*